United States Patent [19]
Hsiung

[11] Patent Number: 5,283,802
[45] Date of Patent: Feb. 1, 1994

[54] ADJUSTABLE LASER MODULE MOUNTING DEVICE

[76] Inventor: Bear Hsiung, 5F, No. 30, Lane 179, Sec. 2, Nei Hu Rd., Taipei, Taiwan

[21] Appl. No.: 71,403

[22] Filed: Jun. 4, 1993

[51] Int. Cl.$^5$ ............................ H01S 3/08; G02B 6/26
[52] U.S. Cl. .................................... 372/107; 372/108; 372/43; 385/52; 385/92; 385/93
[58] Field of Search ................... 372/43, 50, 107, 108; 385/14, 33, 34, 35, 49, 52, 88, 90, 91, 93; 250/227.11

[56] References Cited

U.S. PATENT DOCUMENTS

| | | | |
|---|---|---|---|
| 4,749,250 | 6/1988 | Carter | 372/107 X |
| 4,767,178 | 8/1988 | Sasaki et al. | 385/93 X |
| 4,918,702 | 4/1990 | Kimura | 372/107 X |
| 5,048,050 | 9/1991 | Komurasaki | 372/107 X |
| 5,150,376 | 9/1992 | Ohmori et al. | 372/107 |
| 5,193,099 | 3/1993 | Chou | 385/86 X |
| 5,239,605 | 8/1993 | Shimada | 385/93 X |

*Primary Examiner*—Brian Healy
*Attorney, Agent, or Firm*—Browdy and Neimark

[57] ABSTRACT

An adjustable laser module mounting device which includes an inner socket fastened to a lens holder through a screw joint to hold a condensing lens by a rubber ring, a laser diode fastened to the inner socket at the back, an adjusting end block, and a printed circuit board connected between the laser diode and the adjusting end block. The focal distance of the condensing lens is adjusted by rotating the lens holder on the inner socket in either direction. The alignment of the laser diode with the condensing lens is adjusted by turning the adjusting end block in either direction.

1 Claim, 6 Drawing Sheets

ADJUSTABLE LASER MODULE MOUNTING DEVICE

BACKGROUND OF THE INVENTION

A variety of laser modules have been disclosed, and have been widely used in making layer sights and laser pointers, which commonly use a laser diode to produce a laser beam. FIGS. 1 and 2 illustrate two structures of laser module mounting device according to the prior art. These structures are similar, each comprising a lens holder (1b;1c) to hold a condensing lens (3b;3c), a fastening block (7b;7c) to fasten the condensing lens to the lens holder, a barrel (4b;4c) to hold a laser diode (5b;5c), a printed circuit board (6b;6c) connected to the laser diode for operation control, and a cylindrical casing (8b;8c) to hold the aforesaid components in place. By turning the lens holder (1b) or the barrel (4c) in either direction, the focus is adjusted. These structures of laser module mounting device are not satisfactory in function and have some drawbacks. Because the fastening block is fastened to the lens holder by a screw joint or an adhesive agent to hold the condensing lens in place, it is difficult to adjust the focus when the internal structure is vibrated to displace and to produce a deformed oval light spot. Further, because the laser diode and the printed circuit board are fastened inside the cylindrical casing in parallel with each other, it is difficult to adjust the focus when the laser diode or the printed circuit board is tiled.

Further, the configuration of the light spot of the laser beam of a laser diode may vary with different installation conditions. As illustrated in FIGS. 3 and 4, the laser beam from a laser diode 1a is in a conical shape 2a, and the image formed is an oval light spot 3a. An angle (normal side relief angle) $\theta$ is formed by connecting the two opposite ends a;a' of the major axis of the oval light spot 3a with the laser firing point. This angle is about 20° to 40°. An angle (normal end relief angle) $\theta'$ is formed by connecting the two opposite ends b;b' of the minor axis of the oval light spot 3a with the laser firing point. This angle is about 6° to 12°. Referring to FIG. 5, when a plano-convex lens 4a is disposed in front of the laser beam 11a, the laser beam is refracted into a cylindrical light beam 21a to form a circular light spot 31a on an object. Referring to FIG. 6, when a tube 6a is mounted around the laser diode and the plano-convex lens, a ring of light 7a will occur around the light spot 32a. Referring to FIG. 7, when the front end of the tube, which hold the laser diode and the plano-convex lens, is blocked with a small laser firing hole 8a left for passing the laser beam, the ring of light shown in FIG. 6 is eliminated, and therefore the image formed on an object is a circular light spot.

SUMMARY OF THE INVENTION

The present invention has been accomplished under the aforesaid circumstances. It is therefore the principal object of the present invention to provide an adjustable laser module mounting device which eliminates the drawbacks of the aforesaid prior art adjustable laser module mounting devices. It is another object of the present invention to provide an adjustable laser module mounting device which is easy to assemble and disassemble. It is still another object of the present invention to provide an adjustable laser module mounting device which can be conveniently adjusted to correct the focal distance of the lens and the alignment between the laser diode and the lens. According to the preferred embodiment of the present invention, the adjustable laser module mounting device is comprised of an inner socket fastened to a lens holder through a screw joint to hold a condensing lens by a rubber ring, a laser diode fastened to the inner socket at the back, an adjusting end block, and a printed circuit board connected between the laser diode and the adjusting end block. The focal distance of the condensing lens is adjusted by rotating the lens holder on the inner socket in either direction. The alignment of the laser diode with the condensing lens is adjusted by turning the adjusting end block in either direction.

DETAILED DESCRIPTION OF THE PREFERRED EMBODIMENT

Figure 1:
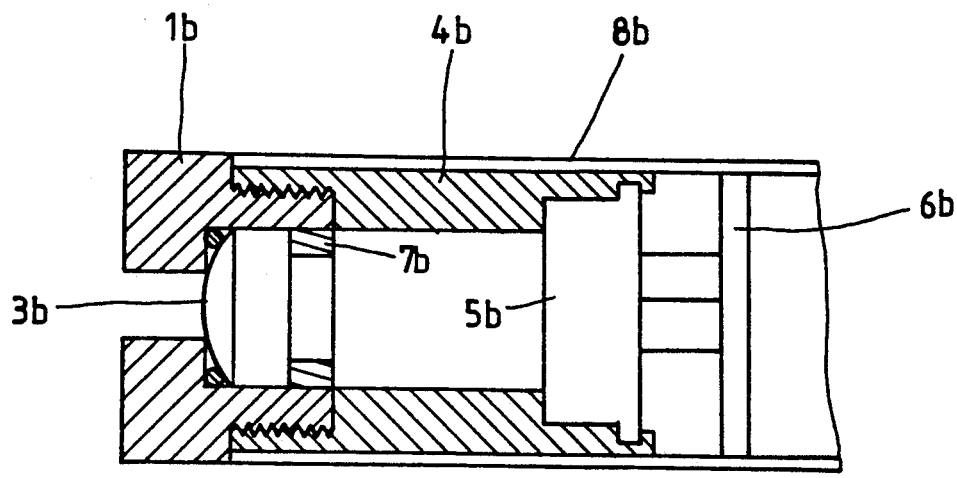
FIG. 1 is a longitudinal sectional view of an adjustable laser module mounting device according to the prior art.
Figure 2:
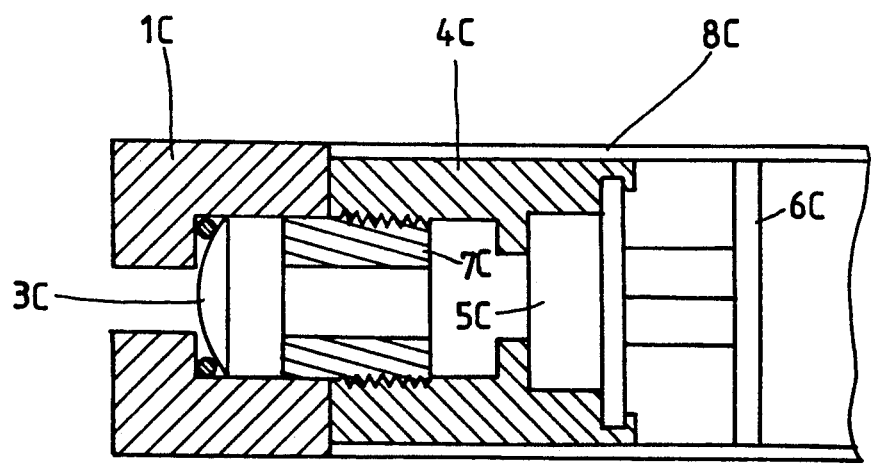
FIG. 2 is a longitudinal sectional view of another structure of adjustable laser module mounting device according to the prior art.
Figure 3:
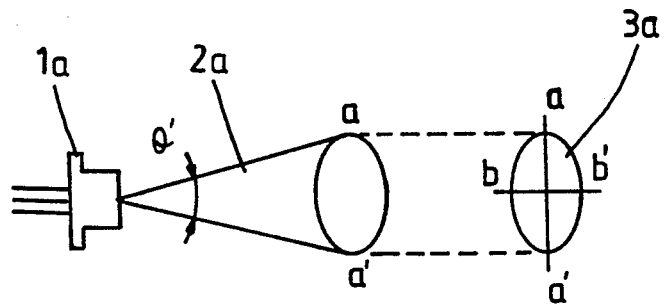
FIGS. 3 and 4 are schematic drawings showing a light spot formed by a laser beam.
Figure 4:
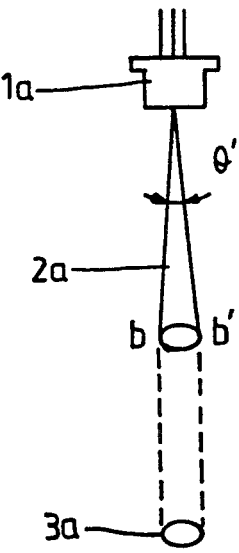
Figure 5:
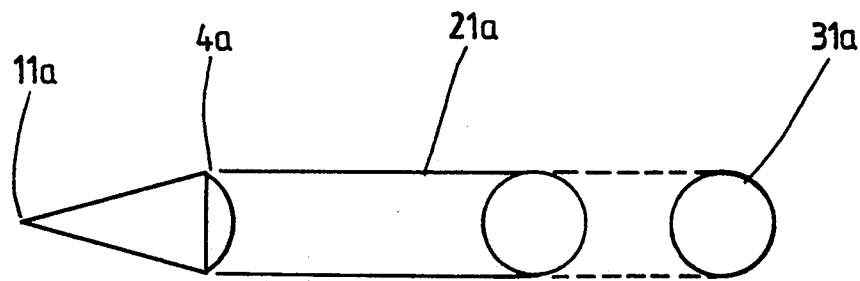
FIG. 5 is a schematic drawing showing a light spot formed by a laser beam through a plano-convex lens.
Figure 6:
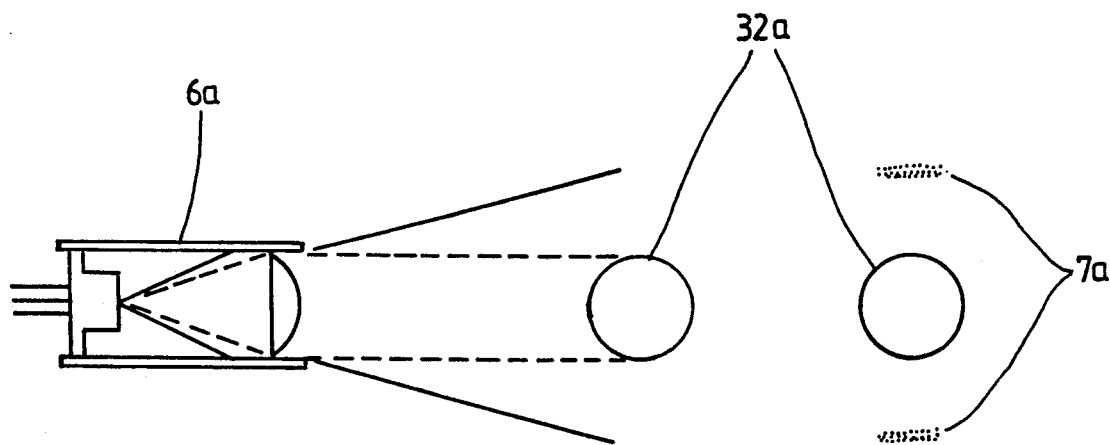
FIG. 6 is a schematic drawing showing a light spot formed by a laser beam through a plano-convex lens held within a cylindrical casing.
Figure 7:
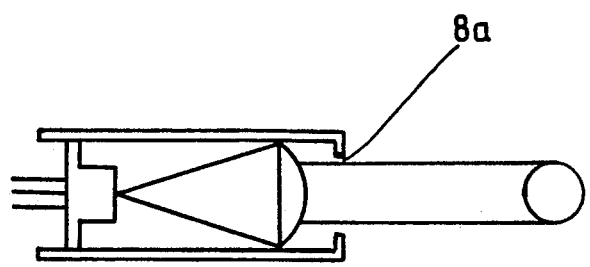
FIG. 7 is a schematic drawing showing a light spot formed by a laser beam through a plano-convex lens and a small center firing hole on a lens holder.
Figure 8:
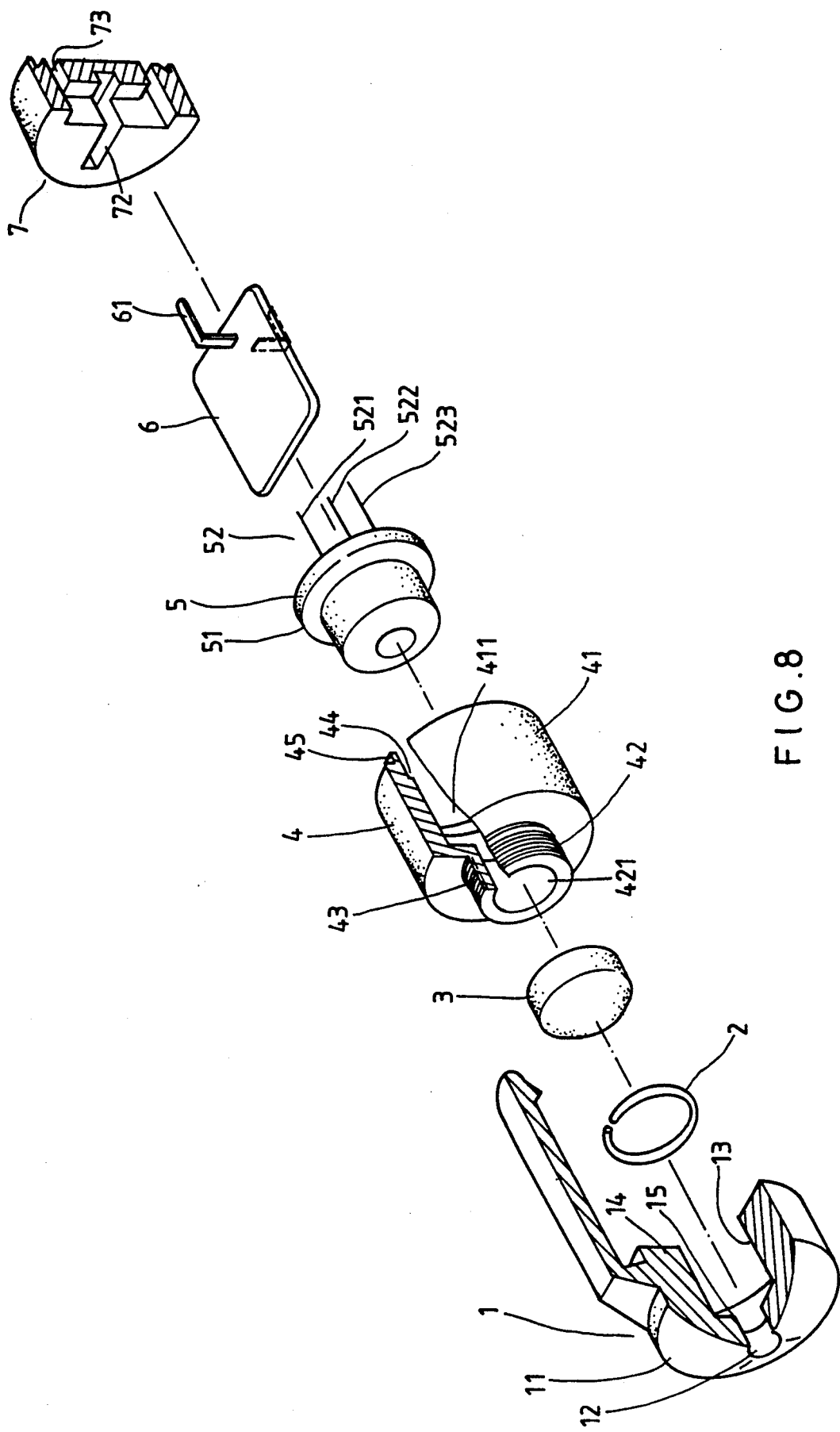
FIG. 8 is a perspective exploded view of an adjustable mounting device according to the preferred embodiment of the present invention.
Figure 9:
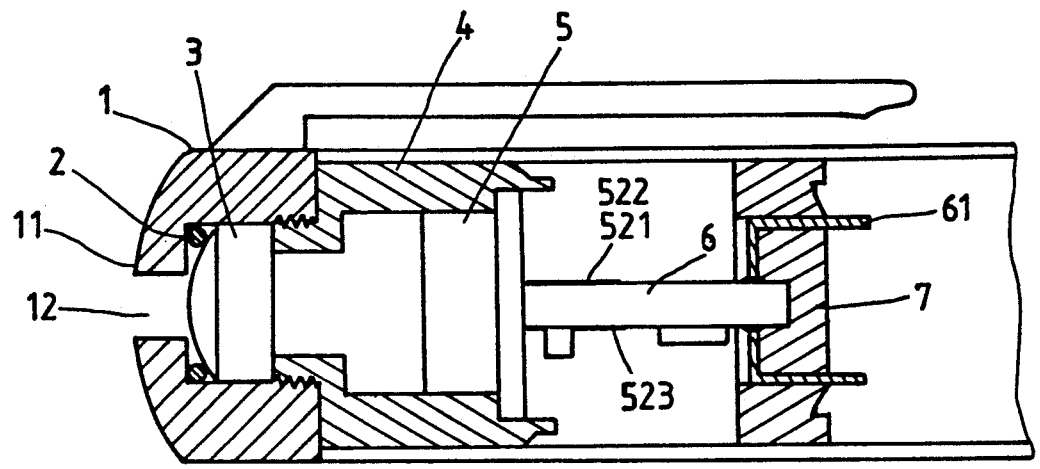
FIG. 9 is a longitudinal sectional view of the adjustable laser module mounting device shown in FIG. 8.
Figure 10:
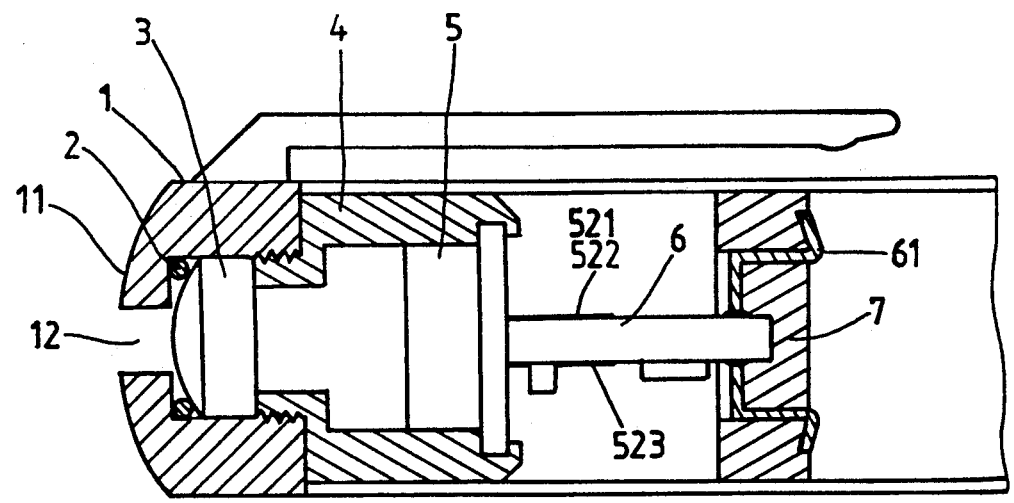
FIG. 10 is similar to FIG. 9 but showing an alternate form of the mounting pin of the printed circuit board.
Figure 11:
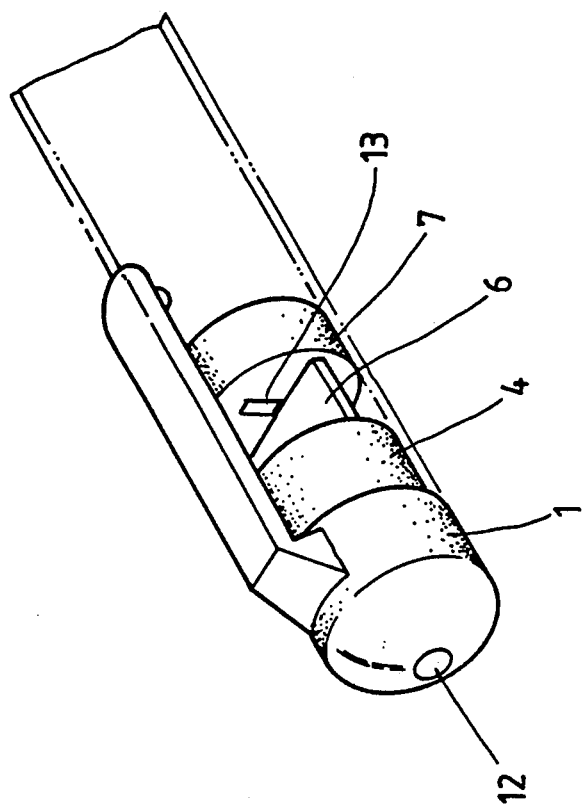
FIG. 11 is a perspective view of the adjustable laser module mounting device of the preferred embodiment of the present invention.

Referring to the annexed drawings in detail, an adjustable laser module mounting device in accordance with the preferred embodiment of the present invention is generally comprised of a lens holder 1, a rubber ring 2, a condensing lens 3, an inner socket 4, a laser diode 5, a printed circuit board 6, and an adjusting end block 7.

The lens holder 1 is made in a cylindrical configuration having a laser firing hole 12 through the center of a conical front end 11 thereof, a rear chamber 13, which receives the condensing lens 3, a shoulder 15 inside the rear chamber 13, on which the rubber ring 2 is mounted to support the condensing lens 3, and an inner thread 14 around the rear chamber 13. The condensing lens 3 is integrally shape molded, and received inside the rear chamber 13. The front end of the condensing lens 3 curves outwards to achieve better light condensing performance. The inner socket 4 is comprised of a big cylinder 41 and a small cylinder 42 connected in the longitudinal direction. The bore 411 of the big cylinder 41 is communicated with the bore 421 of the small cylinder 42. The small cylinder 42 has an outer thread 42 threaded into the inner thread 14 on the rear chamber 13 of the lens holder 1. The big cylinder 41 comprises an annular groove 44 around the bore 411 at an outer end, and a rear projection 45. The laser diode 5 is inserted in the big cylinder 41 of the inner socket 4, having an outward rear flange 51 fitted into the annular groove 44 on the big cylinder 41 of the inner socket 4. The printed circuit board 6 is made from a flat, rectangular board in thickness corresponding to the pitch between the legs 52 of the laser diode 5, having mounting pins 61 at the rear end thereof for mounting on the adjusting end block 7. Two legs 521;522 of the laser diode 5 are welded to the printed circuit board 6 at the top, and the other leg 523 of the laser diode 5 is welded to the printed circuit board 6 at the bottom. The adjusting end block 7 is made in a round shape having an elongated slot 72 and two pin holes 73 for mounting the printed circuit board 6.

The assembly process of the laser module mounting device is easy and outlined hereinafter. After the rubber ring 2 and the condensing lens 3 have been inserted in the rear chamber 13 of the lens holder 1 in proper order, the inner socket 4 is fastened to the lens holder by threading the outer thread 43 of the small cylinder 42 of the inner socket 4 into the inner thread 14 of the lens holder 1, then the laser diode 5 is fastened to the inner socket 4 by engaging the outward flange 51 of the laser diode 5 into the annular groove 44 on the inner socket 4, then the legs 521;522;523 of the laser diode 5 are respectively welded to the printed circuit board 6, and then the adjusting end block 7 is fastened to the printed circuit board 6 by inserting the printed circuit board 6 into the slot 72 and the mounting pins 61 into the pin holes 73 respectively.

When in use, the laser diode 5 is controlled by the printed circuit board 6 to emit a laser beam through the condensing lens 3. The condensed laser beam projects out of the lens holder 1 through the laser firing hole 12. While passing through the laser firing hole 12, the border area of the laser beam is blocked by the shoulder 15, and therefore the laser beam is confined to a circular light spot. The focus of the laser beam can be conveniently adjusted by rotating the lens holder 1 on the small cylinder 42 of the inner socket 4. When adjusted, the connection between the inner socket 4 and the lens holder 1 is sealed by an adhesive agent. In case the axis of the laser beam of the laser diode 5 is not aligned with the focal point of lens 3, a circular shift will occur. When a circular shift occurs, it can be eliminated by rotating the adjusting end block 7 to align the laser diode 5 with the lens 3. When adjusted, a positioning mark is made on the adjusting end block 7 for check.

What is claimed is:

1. An adjustable laser module mounting device comprising:
   a lens holder made in a cylindrical configuration having a laser firing hole through the center of a conical front end thereof, a rear chamber, a shoulder inside said rear chamber around said laser firing hole, and an inner thread around said rear chamber;
   a rubber ring mounted on said shoulder around said laser firing hole;
   a condensing lens received inside said rear chamber and stopped against said rubber ring, said condensing lens having a front surface curved outwards;
   an inner socket comprised of a big cylinder and a small cylinder longitudinally connected to said big cylinder at one end, said big and small cylinders each having a bore communicated with each other, said small cylinder having an outer thread threaded into said inner thread of said lens holder to stop said condensing lens against said rubber ring, said big cylinder having an annular groove around the inside wall at a rear end thereof;
   a laser diode inserted in said big cylinder of said inner socket and having an outward rear flange fitted into said annular groove on said big cylinder of said inner socket and three contact legs respectively welded to said printed circuit board;
   a printed circuit board made from a flat, rectangular board and disposed behind said laser diode, said printed circuit board having mounting pins at a rear end thereof;
   an adjusting end block connected to said printed circuit board, said adjusting end block having an elongated slot, which receives said printed circuit board, and a plurality of pin holes, which receive said mounting pins of said printed circuit board respectively;
   whereby when said laser diode is driven by said printed circuit board to produce a laser beam through said laser firing hole via said condensing lens, the border of the laser beam is blocked by said shoulder of said lens holder so that the laser beam forms a circular light spot on an object; the focal distance of said condensing lens is adjusted by rotating said lens holder on said inner socket; the alignment of said laser diode with said condensing lens is adjusted by turning said adjusting end block in either direction.

* * * * *